US011342108B2

(12) United States Patent
Wen et al.

(10) Patent No.: US 11,342,108 B2
(45) Date of Patent: May 24, 2022

(54) STACKABLE NEAR-FIELD COMMUNICATIONS ANTENNAS

(71) Applicant: International Business Machines Corporation, Armonk, NY (US)

(72) Inventors: Bo Wen, New York, NY (US); Bing Dang, Chappaqua, NY (US); Rajeev Narayanan, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 15/977,178

(22) Filed: May 11, 2018

(65) Prior Publication Data

US 2019/0348209 A1    Nov. 14, 2019

(51) Int. Cl.
*H01F 27/28* (2006.01)
*H02J 7/02* (2016.01)
(Continued)

(52) U.S. Cl.
CPC ....... *H01F 27/2804* (2013.01); *H01F 27/323* (2013.01); *H01F 41/043* (2013.01);
(Continued)

(58) Field of Classification Search
CPC ............... H01F 27/2804; H01F 27/323; H01F 2027/2809; H02J 50/10; H02J 50/20;
(Continued)

(56) References Cited

U.S. PATENT DOCUMENTS 9,064,626 B2 *  6/2015  Yoo ............... H01F 17/0013
9,595,383 B2    3/2017  Chien et al.
(Continued)

FOREIGN PATENT DOCUMENTS

CN    1988069 A    6/2007
CN  104766714 A    7/2015
(Continued)

OTHER PUBLICATIONS

Shi, et al., Wireless Power Hotspot that Charges All of Your Devices, Wireless Power Hotspot that Charges All of Your Devices, Sep. 2015, 12 Pages.

(Continued)

*Primary Examiner* — Richard V Muralidar
(74) *Attorney, Agent, or Firm* — Amin, Turocy & Watson, LLP

(57) ABSTRACT

Techniques regarding one or more NFC antennas that can comprise vertically stacked coils of electrically conductive material are provided. For example, one or more embodiments described herein can comprise an apparatus, which can comprise can a first substrate layer that can comprise a first coil of electrically conductive material that can be wound in a first direction. The apparatus can also comprise a second substrate layer that can comprise a second coil of electrically conductive material that can be wound in a second direction opposite the first direction. The first substrate layer can be stacked onto the second substrate layer. Also, the first coil of electrically conductive material can be operably coupled to the second coil of electrically conductive material through an interconnection via to form an NFC antenna.

20 Claims, 12 Drawing Sheets

(51) Int. Cl.

| | |
|---|---|
| *H02J 50/10* | (2016.01) |
| *H02J 50/20* | (2016.01) |
| *H01Q 7/00* | (2006.01) |
| *H01F 41/04* | (2006.01) |
| *H01F 41/12* | (2006.01) |
| *H04B 5/00* | (2006.01) |
| *H01F 27/32* | (2006.01) |

(52) U.S. Cl.
CPC ............ *H01F 41/122* (2013.01); *H01Q 7/00* (2013.01); *H02J 7/025* (2013.01); *H02J 50/10* (2016.02); *H02J 50/20* (2016.02); *H04B 5/0037* (2013.01); *H04B 5/0081* (2013.01); *H01F 2027/2809* (2013.01)

(58) Field of Classification Search
CPC ...... H02J 7/025; H02F 41/043; H02F 41/122; H01Q 7/00
USPC ........................................................ 320/108
See application file for complete search history.

(56) References Cited

U.S. PATENT DOCUMENTS

| | | | | |
|---|---|---|---|---|
| 9,825,674 | B1* | 11/2017 | Leabman | ................ H02J 5/005 |
| 9,899,145 | B2* | 2/2018 | Covic | ..................... H02J 50/90 |
| 10,638,611 | B2* | 4/2020 | Nishikawa | ............ H01F 27/292 |
| 2015/0054457 | A1 | 2/2015 | Kim | |
| 2015/0130579 | A1* | 5/2015 | Kim | .................. H01F 27/2804 |
| | | | | 336/200 |
| 2016/0308384 | A1 | 10/2016 | Zhang et al. | |
| 2016/0345125 | A1* | 11/2016 | Kim | ..................... H04B 5/0087 |
| 2017/0040825 | A1 | 2/2017 | Cavallaro et al. | |
| 2017/0093021 | A1 | 3/2017 | Kim et al. | |
| 2017/0170688 | A1 | 6/2017 | Maniktala | |
| 2017/0237292 | A1 | 8/2017 | Jeong et al. | |
| 2017/0310144 | A1 | 10/2017 | Madau | |
| 2018/0122563 | A1* | 5/2018 | Matsuura | ................. H01B 1/02 |
| 2018/0211775 | A1* | 7/2018 | Salvatti | ................. H01F 41/041 |
| 2019/0027293 | A1* | 1/2019 | Ch | ........................ H01F 27/325 |
| 2019/0229030 | A1* | 7/2019 | Weidner | ............... H01L 23/473 |

FOREIGN PATENT DOCUMENTS

| | | |
|---|---|---|
| CN | 106537532 A | 3/2017 |
| CN | 107025989 A | 8/2017 |
| EP | 298707 A2 | 11/1989 |
| WO | 2018/060265 A1 | 4/2018 |

OTHER PUBLICATIONS

First Office Action received for Chinese Patent Application Serial No. 201910373312.X dated Aug. 3, 2020, 28 pages. (Including English Translation).

Office Action received for Chinese Patent Application Serial No. 201910373312.X dated Nov. 2, 2021, 9 pages.

Chinese Office Action for Chinese Application Serial No. 201910373312.X dated Jul. 26, 2021, 10 pages.

Second Office Action received for Chinese Patent Application Serial No. 201910373312.X dated Mar. 11, 2021, 8 pages. (Including English Translation).

* cited by examiner

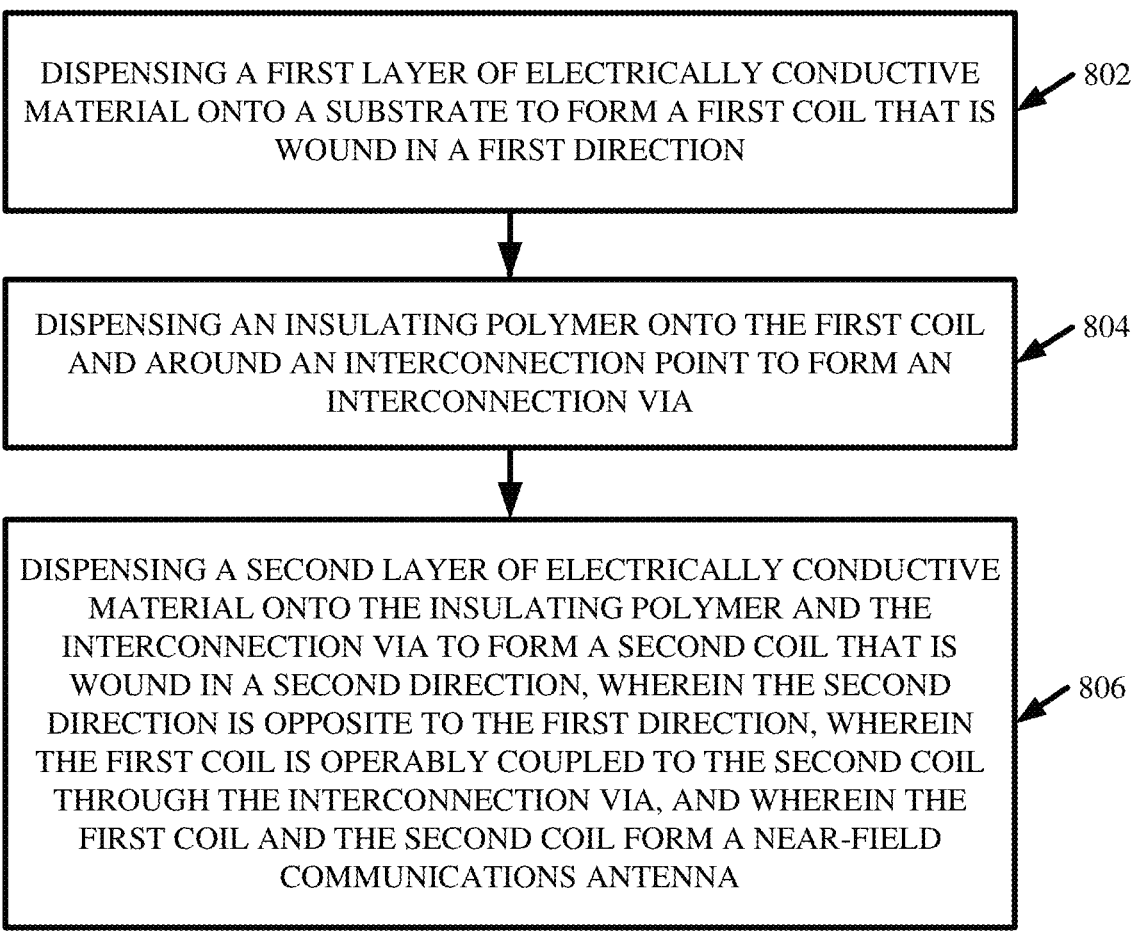

902 — DISPENSING A FIRST LAYER OF ELECTRICALLY CONDUCTIVE MATERIAL ONTO A SUBSTRATE TO FORM A FIRST COIL THAT IS WOUND IN A FIRST DIRECTION

↓

904 — DISPENSING AN INSULATING POLYMER ONTO THE FIRST COIL AND AROUND AN INTERCONNECTION POINT TO FORM AN INTERCONNECTION VIA

↓

906 — DISPENSING A SECOND LAYER OF ELECTRICALLY CONDUCTIVE MATERIAL ONTO THE INSULATING POLYMER AND THE INTERCONNECTION VIA TO FORM A SECOND COIL THAT IS WOUND IN A SECOND DIRECTION, WHEREIN THE SECOND DIRECTION IS OPPOSITE TO THE FIRST DIRECTION, WHEREIN THE FIRST COIL IS OPERABLY COUPLED TO THE SECOND COIL THROUGH THE INTERCONNECTION VIA, AND WHEREIN THE FIRST COIL AND THE SECOND COIL FORM A NEAR-FIELD COMMUNICATIONS ANTENNA

↓

908 — DISPENSING A SECOND INSULATING POLYMER ONTO THE SECOND COIL AND AROUND A SECOND INTERCONNECTION POINT TO FORM A SECOND INTERCONNECTION VIA

↓

910 — DISPENSING A THIRD LAYER OF ELECTRICALLY CONDUCTIVE MATERIAL ONTO THE SECOND INSULATING POLYMER AND THE SECOND INTERCONNECTION VIA TO FORM A THIRD COIL THAT IS WOUND IN THE FIRST DIRECTION, WHEREIN THE THIRD COIL IS OPERABLY COUPLED TO THE SECOND COIL THROUGH THE SECOND INTERCONNECTION VIA, WHEREIN THE SECOND INTERCONNECTION VIA IS LOCATED AT A FIRST END OF THE SECOND COIL, WHEREIN THE INTERCONNECTION VIA IS LOCATED AT A SECOND END OF THE SECOND COIL, AND WHEREIN THE THIRD COIL IS COMPRISED WITHIN THE NEAR FIELD COMMUNICATIONS ANTENNA

```
┌─────────────────────────────────────────────────┐
│ DEFINING A FIRST ELECTRICALLY CONDUCTIVE COIL   │
│ INTO A FIRST SUBSTRATE LAYER USING              │ ← 1002
│ PHOTOLITHOGRAPHY, WHEREIN THE FIRST             │
│ ELECTRICALLY CONDUCTIVE COIL IS WOUND IN A      │
│ FIRST DIRECTION                                 │
└─────────────────────────────────────────────────┘
                        ↓
┌─────────────────────────────────────────────────┐
│ DEFINING A SECOND ELECTRICALLY CONDUCTIVE COIL  │
│ INTO A SECOND SUBSTRATE LAYER USING             │
│ PHOTOLITHOGRAPHY, WHEREIN THE SECOND            │ ← 1004
│ ELECTRICALLY CONDUCTIVE COIL IS WOUND IN A      │
│ SECOND DIRECTION OPPOSITE TO THE FIRST          │
│ DIRECTION                                       │
└─────────────────────────────────────────────────┘
                        ↓
┌─────────────────────────────────────────────────┐
│ STACKING THE SECOND SUBSTRATE LAYER ONTO THE    │
│ FIRST SUBSTRATE LAYER, WHEREIN THE FIRST        │
│ ELECTRICALLY CONDUCTIVE COIL IS OPERABLY        │ ← 1006
│ COUPLED TO THE SECOND ELECTRICALLY CONDUCTIVE   │
│ COIL TO FORM A NEAR-FIELD COMMUNICATIONS        │
│ ANTENNA                                         │
└─────────────────────────────────────────────────┘
```

```
┌─────────────────────────────────────────────────────┐
│ DEFINING A FIRST ELECTRICALLY CONDUCTIVE COIL INTO A │
│ FIRST SUBSTRATE LAYER USING PHOTOLITHOGRAPHY,        │ ← 1102
│ WHEREIN THE FIRST ELECTRICALLY CONDUCTIVE COIL IS    │
│ WOUND IN A FIRST DIRECTION                           │
└─────────────────────────────────────────────────────┘
                         ↓
┌─────────────────────────────────────────────────────┐
│ DEFINING A SECOND ELECTRICALLY CONDUCTIVE COIL INTO A│
│ SECOND SUBSTRATE LAYER USING PHOTOLITHOGRAPHY,       │ ← 1104
│ WHEREIN THE SECOND ELECTRICALLY CONDUCTIVE COIL IS   │
│ WOUND IN A SECOND DIRECTION OPPOSITE TO THE FIRST    │
│ DIRECTION                                            │
└─────────────────────────────────────────────────────┘
                         ↓
┌─────────────────────────────────────────────────────┐
│ STACKING THE SECOND SUBSTRATE LAYER ONTO THE FIRST   │
│ SUBSTRATE LAYER, WHEREIN THE FIRST ELECTRICALLY      │
│ CONDUCTIVE COIL IS OPERABLY COUPLED TO THE SECOND    │ ← 1106
│ ELECTRICALLY CONDUCTIVE COIL THROUGH AN              │
│ INTERCONNECTION VIA TO FORM A NEAR-FIELD             │
│ COMMUNICATIONS ANTENNA                               │
└─────────────────────────────────────────────────────┘
                         ↓
┌─────────────────────────────────────────────────────┐
│ DEFINING A THIRD ELECTRICALLY CONDUCTIVE COIL INTO A │
│ THIRD SUBSTRATE LAYER USING PHOTOLITHOGRAPHY,        │ ← 1108
│ WHEREIN THE THIRD ELECTRICALLY CONDUCTIVE COIL IS    │
│ WOUND IN THE FIRST DIRECTION                         │
└─────────────────────────────────────────────────────┘
                         ↓
┌─────────────────────────────────────────────────────┐
│ STACKING THE THIRD SUBSTRATE LAYER ONTO THE SECOND   │
│ SUBSTRATE LAYER, WHEREIN THE THIRD ELECTRICALLY      │
│ CONDUCTIVE COIL IS OPERABLY COUPLED TO THE SECOND    │
│ ELECTRICALLY CONDUCTIVE COIL VIA A SECOND            │
│ INTERCONNECTION VIA, WHEREIN THE INTERCONNECTION VIA │ ← 1110
│ IS LOCATED AT A FIRST END OF THE SECOND ELECTRICALLY │
│ CONDUCTIVE COIL, WHEREIN THE SECOND INTERCONNECTION  │
│ VIA IS LOCATED AT A SECOND END OF THE SECOND         │
│ ELECTRICALLY CONDUCTIVE COIL, AND WHEREIN THE THIRD  │
│ ELECTRICALLY CONDUCTIVE COIL IS COMPRISED WITHIN THE │
│ NEAR-FIELD COMMUNICATIONS ANTENNA                    │
└─────────────────────────────────────────────────────┘
```

STACKABLE NEAR-FIELD COMMUNICATIONS ANTENNAS

BACKGROUND

The subject disclosure relates to one or more three-dimensional structures for near-field communication antennas, and more specifically, to one or more stackable coil structures that can act as near-field communications antennas to facilitate wireless charging.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that can regarding one or more stackable coil structures that can utilize near-field communications technology to facilitate wireless charging are described.

According to an embodiment, an apparatus is provided. The apparatus can comprise a first substrate layer that can comprise a first coil of electrically conductive material that can be wound in a first direction. The apparatus can also comprise a second substrate layer that can comprise a second coil of electrically conductive material that can be wound in a second direction opposite the first direction. The first substrate layer can be stacked onto the second substrate layer. Also, the first coil of electrically conductive material can be operably coupled to the second coil of electrically conductive material through an interconnection via to form a near-field communications antenna.

According to another embodiment, a method is provided. The method can comprise dispensing a first layer of electrically conductive material onto a substrate to form a first coil that can be wound in a first direction. The method can also comprise dispensing an insulating polymer onto the first coil and around an interconnection point to form an interconnection via. Further, the method can comprise dispensing a second layer of electrically conductive material onto the insulating polymer and the interconnection via to form a second coil that can be wound in a second direction. The second direction can be opposite to the first direction. The first coil can be operably coupled to the second coil through the interconnection via. Also, the first coil and the second coil can form a near-field communications antenna.

According to another embodiment, a method is provided. The method can comprise defining a first electrically conductive coil into a first substrate layer using photolithography. The first electrically conductive coil can be wound in a first direction. The method can also comprise defining a second electrically conductive coil into a second substrate layer using photolithography. The second electrically conductive coil can be wound in a second direction opposite to the first direction. Further, the method can comprise stacking the second substrate layer onto the first substrate layer. The first electrically conductive coil can be operably coupled to the second electrically conductive coil to form a near-field communications antenna.

BRIEF DESCRIPTION OF THE DRAWINGS

FIG. 8 illustrates a flow diagram of an example, non-limiting method that can facilitate manufacturing one or more near-field communications antennas that can comprise a plurality of coils stacked in a vertical orientation in accordance with one or more embodiments described herein.

FIG. 9 illustrates a flow diagram of an example, non-limiting method that can facilitate manufacturing one or more one or more near-field communications antennas that can comprise a plurality of coils stacked in a vertical orientation in accordance with one or more embodiments described herein.

FIG. 10 illustrates a flow diagram of an example, non-limiting method that can facilitate manufacturing one or more one or more near-field communications antennas that can comprise a plurality of coils stacked in a vertical orientation in accordance with one or more embodiments described herein.

FIG. 11 illustrates a flow diagram of an example, non-limiting method that can facilitate manufacturing one or more one or more near-field communications antennas that can comprise a plurality of coils stacked in a vertical orientation in accordance with one or more embodiments described herein.

DETAILED DESCRIPTION

Figure 1:
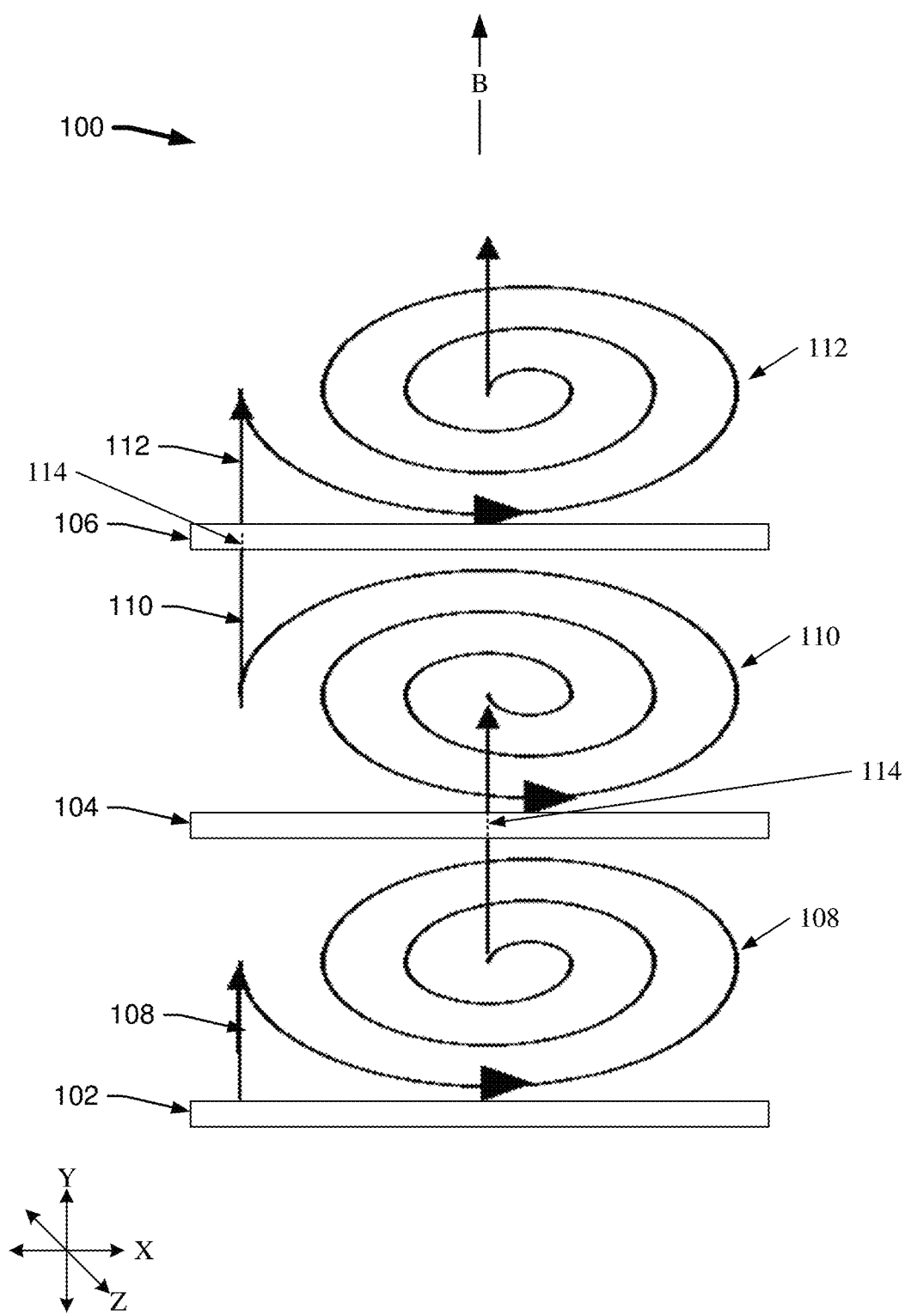
FIG. 1 illustrates a diagram of an example, non-limiting near-field communications antenna that can comprise a plurality of coils stacked in a vertical orientation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Near-field communications ("NFC") technology can be utilized to facilitate wireless charging and/or trigger the execution of various computer program instructions. For example, NFC technology is typically used to facilitate the charging of mobile devices (e.g., smart phones and/or smart wearables) and/or facilitate the automation of pre-programmed routines (e.g., automated payment systems). Typical NFC antennas comprise a coiled wire, wherein the length of the wire can directly affect the efficiency and/or performance characteristics of the NFC antenna. Thus, typical NFC antennas attempt to position as much wire within an available surface area as possible, traditionally by reducing the thickness of the wire and/or increasing the amount of turns in the coil.

Various embodiments described herein can regard one or more NFC antennas that can comprise a plurality of layers stacked in a vertical orientation, wherein the layers can respectively comprise a coil of electrically conductive material (e.g., a wire). The coils of adjacent layers can be wound in opposite directions (e.g., clockwise and/or counter-clockwise) and connected through a plurality of vias. Further, the position of the vias within the stack of layers can alternate between central regions and periphery regions between conjoined layers. By alternating the winding direction of adjacent coils and/or the interconnection region between layers, the one or more NFC antennas can comprise a continuous conductive material (e.g., wire) that can extend both horizontally (e.g., on each layer) and/or vertically (e.g., amongst the stacked layers). Therefore, whereas traditional NFC antennas extend in two-dimensions (e.g., extend horizontally in, for example, a coil pattern); the various embodiments described herein can comprise an NFC antenna that can extend in three-dimensions (e.g., horizontally and/or vertically, for example, amongst a plurality of stacked layers). Furthermore, the unique structures of the one or more embodiments described herein can ensure that induced current generated by the electrically conductive material (e.g., wire) will flow in the same direction in each of the layers; thus, the induced current within one layer of the NFC antenna will not cancel the induced current of another layer of the NFC antenna.

In one or more embodiments, the one or more NFC antennas described herein can be connected to a battery to facilitate wireless charging of the battery. For example, the battery and/or the one or more NFC antennas can be comprised within a mobile computer device, such as a smart phone and/or smart wearable device. In one or more embodiments, the one or more NFC antennas described herein can facilitate execution, by a processor, of one or more computer program instructions. For example, the one or more NFC antennas described herein can be comprised within one or more NFC tags. Further, in one or more embodiments the one or more NFC antennas described herein can be comprised within a charging station to facilitate wireless charging of an external battery.

FIG. 1 illustrates a diagram of an example, non-limiting NFC antenna 100 that can comprise a plurality of electrically conductive coils stacked in a vertical orientation in accordance with one or more embodiments described herein. FIG. 1 depicts the various features of the NFC antenna 100 from an exploded view point to facilitate description of the NFC antenna's structure.

The NFC antenna 100 can comprise a plurality of substrate layers stacked in a vertical orientation (e.g., along the "Y" axis). For example, FIG. 1 shows an NFC antenna 100 comprising three substrate layers: first substrate layer 102, second substrate layer 104, and/or third substrate layer 106. However, the architecture of the NFC antenna 100 is not limited to three substrate layers, rather the NFC antenna 100 can comprise fewer substrate layers (e.g., two layers) and/or additional substrate layers (e.g., four or more layers). For example, the number of substrate layers comprising the NFC antenna can be, but is not limited to, greater than or equal to 2 substrate layers and less than or equal to 10 substrate layers. One of ordinary skill in the art will recognize that, in one or more examples, the NFC antenna 100 can comprise greater than 10 substrate layers (e.g., wherein the NFC antenna 100 comprises a solenoid structure). The substrate layers can be a rigid material, such as a traditional silicon oxide wafer, or a flexible material to facilitate bending of the NFC antenna 100 to accommodate supportive surfaces with various topographies (e.g., surfaces with curves, bumps, ridges, and/or indentations). For example, the plurality of substrate layers (e.g., the first substrate layer 102, the second substrate layer 104, and/or the third substrate layer 106) can be an insulating polymer film (e.g., electrical insulators), including, but not limited to: polyethylene, crosslinked polyethylene, polyvinyl chloride ("PVC"), Kapton, rubber-like polymers, Teflon, silicone, ethylene tetrafluoroethylene ("ETFE"), silicon dioxide, silicon nitride, hafnium dioxide, aluminum oxide, polyimide, benzocyclobutene, a combination thereof, and/or the like.

One or more of respective substrate layers from the plurality of substrate layers can comprise an electrically conductive material, such as an electrical circuit and/or wire. Example materials that can comprise the electrically conductive material can include, but are not limited to: copper, copper alloys, aluminum, aluminum alloys, gold, gold alloys, silver, silver alloys, silver paste, other conductive paste or epoxy, a combination, thereof and/or the like. For example: the first substrate layer 102 can comprise a first electrically conductive material 108; the second substrate layer 104 can comprise a second electrically conductive material 110; and/or the third substrate layer 106 can comprise a third electrically conductive material 112. The first electrically conductive material 108, the second electrically conductive material 110, and/or the third electrically conductive material 112 are shown in FIG. 1 as separated from their respective substrate layer and tilted to facilitate describing the NFC antenna 100 structure.

In one or more embodiments, the electrically conductive materials (e.g., the first electrically conductive material 108, the second electrically conductive material 110, and/or the third electrically conductive material 112) can be embedded, encapsulated, and/or positioned onto a respective substrate layer (e.g., the first substrate layer 102, the second substrate layer 104, and/or the third substrate layer 106). For example: the first electrically conductive material 108 can be embedded, encapsulated, and/or positioned onto the first substrate layer 102; the second electrically conductive material 110 can be embedded, encapsulated, and/or positioned onto the second substrate layer 104; and/or the third electrically conductive material 112 can be embedded, encapsulated, and/or positioned onto the third substrate layer 106.

Further, in one or more embodiments the respective electrically conductive materials can traverse the respective substrate layers along a horizontal plane. For example, the first electrically conductive material 108 can traverse the first substrate layer 102 in a width direction (e.g., along a direction represented by the "X" arrow in FIG. 1) and/or in a length direction (e.g., along a direction represented by the "Z" arrow in FIG. 1). Also, the second electrically conductive material 110 can traverse the second substrate layer 104 in the width direction (e.g., along the direction represented by the "X" arrow in FIG. 1) and/or in the length direction (e.g., along the direction represented by the "Z" arrow in FIG. 1). Further, the third electrically conductive material 112 can traverse the third substrate layer 106 in the width direction (e.g., along the direction represented by the "X" arrow in FIG. 1) and/or in the length direction (e.g., along the direction represented by the "Z" arrow in FIG. 1).

In various embodiments, the respective electrically conductive materials can be oriented into coils. As shown in FIG. 1, respective coils of adjacent substrate layers within the stacked orientation can be wound in opposing directions, such as a clockwise direction versus a counter-clockwise direction. For sake of clarity, coils described herein can be understood to wind from peripheral region of a respective substrate layer to a central region of a respective substrate layer. For example, as shown in FIG. 1, the second electrically conductive material 110 can be oriented into a coil wound in the clockwise direction. In contrast, as shown in FIG. 1, the first electrically conductive material 108 can be oriented into a coil would in the counter-clockwise direction.

For instance, wherein the first electrically conductive material 108 can be a coil that is wound in the counter-clockwise direction (e.g., as shown in FIG. 1), the second electrically conductive material 110 of the adjacent second substrate layer 104 can be a coil that is wound in the clockwise direction. Likewise, wherein the first electrically conductive material 108 can be a coil that is wound in a clockwise direction (not shown), the second electrically conductive material 110 of the adjacent second substrate layer 104 can be a coil that is wound in the counter-clockwise direction. In another instance, wherein the second electrically conductive material 110 can be a coil that is wound in the clockwise direction (e.g., as shown in FIG. 1), the third electrically conductive material 112 of the adjacent third substrate layer 106 can be a coil that is wound in the counter-clockwise direction. Likewise, wherein the second electrically conductive material 110 can be a coil that is wound in the counter-clockwise direction (not shown), the third electrically conductive material 112 of the adjacent third substrate layer 106 can be a coil that is wound in the clockwise direction.

While FIG. 1 illustrates the respective coils having a substantially circular shape, the architecture of the electrically conductive materials is not so limited. Example shapes that can characterize the respective coils can include, but are not limited to: elliptical shapes, triangular shapes, polygon shapes, a combination thereof, and/or the like. Additionally, one of ordinary skill in the art will recognize that the dimensions of the respective coils (e.g., the width along the "X" direction, the length along the "Z" direction, and/or the number of turns) can vary depending on the dimensions of the respective substrate layers and/or the desired function of the NFC antenna 100. For example, respective coils can have a number of turns ranging from, but not limited to, greater than or equal to 1 turns and less than or equal to 500 turns.

The plurality of substrate layers can also comprise one or more interconnection vias 114 to facilitate interconnection between the electrically conductive materials of adjacent substrate layers. Further, the one or more interconnection vias 114 can be positioned within central regions of the NFC antenna 100 and/or within peripheral regions of the NFC antenna 100. The central regions can regard respective regions of the substrate layers that can be located at and/or near the center of the subject substrate layer along the width direction (e.g., represented by the "X" arrow) and/or the length direction (e.g., represented by the "Z" arrow). The peripheral regions can regard respective regions of the substrate layers that can be located at and/or near the perimeter of the subject substrate layer along the width direction (e.g., represented by the "X" arrow) and/or the length direction (e.g., represented by the "Z" arrow). For sake of clarity, the coils of electrically conductive material can be described herein as starting from a first end located in the peripheral region of a subject substrate layer and/or extending to a second end located in the central region of the subject substrate layer. Adjacent coils of electrically conductive material within the stack (e.g., along the vertical direction represented by the "Y" arrow) can be connected from second end to second end and/or from first end to first end through one or more interconnection vias 114.

Furthermore, along the vertical direction (e.g., represented by the "Y" arrow), connections made between adjacent coils of electrically conductive material (e.g., through a respective interconnection via 114) can alternate between the central regions and the peripheral regions. For example, as shown in FIG. 1, a first connection between the first electrically conductive material 108 and the second electrically conductive material 110 can be facilitate by one or more interconnection vias 114 located in the central region of the second substrate layer 104. The second end of the first electrically conductive material 108 and the second end the second electrically conductive material 110 can both extend into an interconnection via 114 located in the central regions and/or operably couple to each other.

In another example, as shown in FIG. 1, the next sequential connection between adjacent coils of electrically conductive material along the vertical direction (e.g., represented by the "Y" arrow) can be a connection between the second electrically conductive material 110 and the third electrically conductive material 112. Since the previous connection between adjacent coils in the vertical direction (e.g., the connection between the first electrically conductive material 108 and/or the second electrically conductive material 110) was located within a central region, the subsequent connection between adjacent coils in the vertical direction (e.g., the connection between the second electrically conductive material 110 and/or the third electrically conductive material 112) can be located within a peripheral region. For instance, one or more interconnection vias 114 located in a periphery of the third substrate layer 106 can facilitate a connection of the first end of the second electrically conductive material 110 and/or the first end of the third electrically conductive material 112. The first end of the second electrically conductive material 110 and the first end the third electrically conductive material 112 can both extend into an interconnection via 114 located in the peripheral regions and/or operably couple to each other. Thus, interconnections between adjacent coils of electrically conductive materials can alternate positions along the vertical direction (e.g., represented by the "Y" arrow) of NFC antenna 100 between central regions and/or periphery regions.

By winding vertically adjacent coils of electrically conductive material in opposing directions (e.g., clockwise and/or counter-clockwise) and/or connecting like-ends of the vertically adjacent coils of electrically conductive material (e.g., first end connected to first end and/or second end connected to second end), an induced current that can be generated by the coils can flow continuously throughout the NFC antenna 100. For example, the arrows shown in FIG. 1 along the electrically conductive materials can indicated the flow of induced electrical current. Additionally, the "B" arrow shown in FIG. 1 can depict a magnetic field associated with the NFC antenna 100.

In one or more embodiments, the respective substrate layer can comprise a plurality of coils of electrically conductive materials. For example, the first substrate layer 102 can comprise first coil of the first electrically conductive material 108 in addition to a second coil of the first electrically conductive material 108. Further, in one or more embodiments the electrically conductive materials can comprise the same materials and/or composition throughout the NFC antenna 100. For example, the first electrically conductive material 108, the second electrically conductive material 110, and/or the third electrically conductive material 112 can comprise the same materials and/or composition. Alternatively, in one or more embodiments the electrically conductive materials of respective substrate layers can differ in material and/or composition. For example, the first electrically conductive material 108 can comprise a different material and/or composition than the second electrically conductive material 110 and/or the third electrically conductive material 112.

Figure 2:
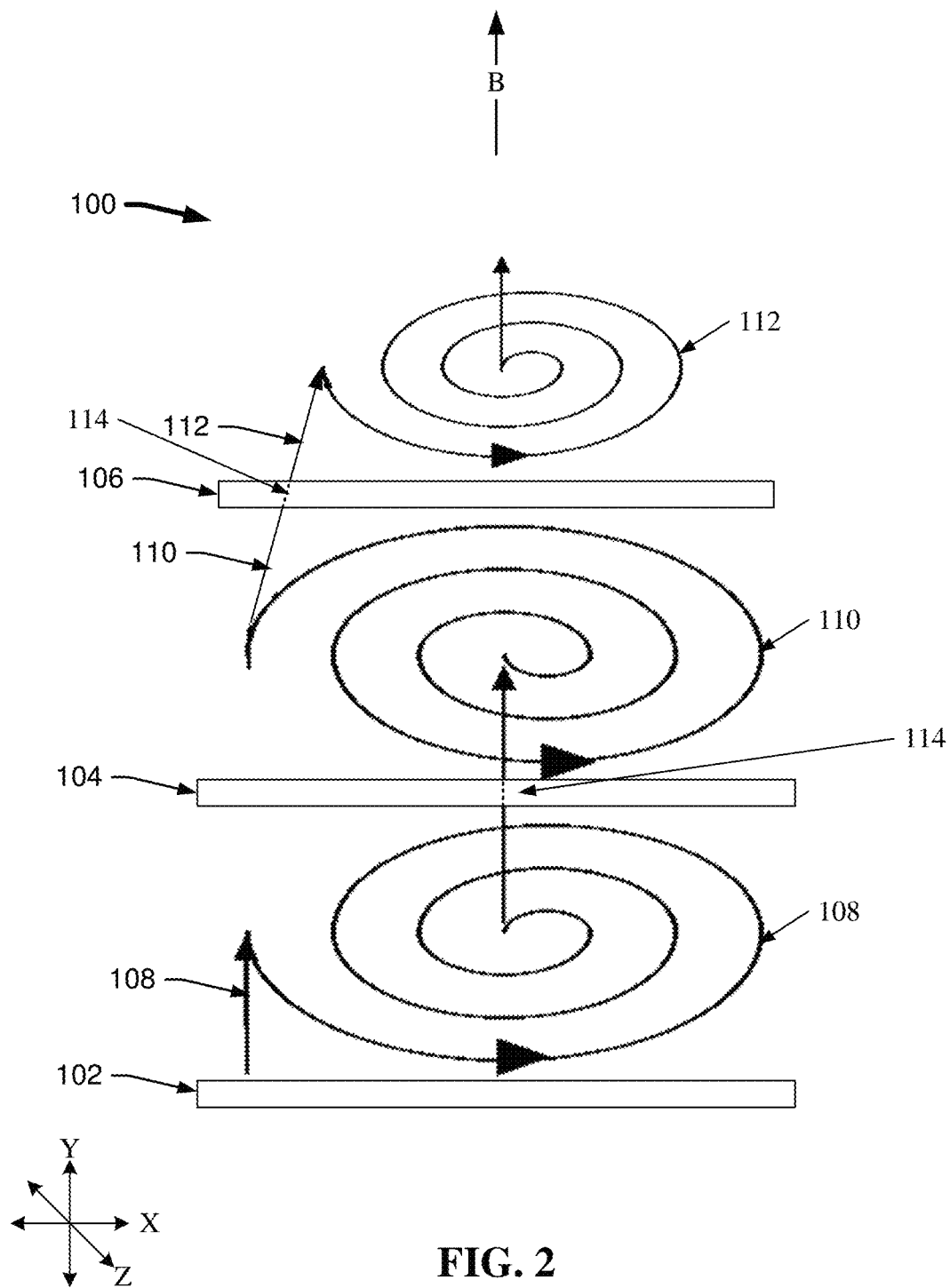
FIG. 2 illustrates another diagram of an example, non-limiting near-field communications antenna that can comprise a plurality of coils stacked in a vertical orientation in accordance with one or more embodiments described herein.

FIG. 2 illustrate a diagram of the example, non-limiting NFC antenna 100 that can comprise a plurality of electrically conductive coils stacked in a vertical orientation in accordance with one or more embodiments described herein. Repetitive description of like elements employed in other embodiments described herein is omitted for sake of brevity. FIG. 2 shows that the respective electrically conductive materials and/or the respective substrate layers can have non-uniform dimensions.

For example, FIG. 2 depicts that the third substrate layer 106 can be shorter in the width direction (e.g., represented by the "X" arrow) than the second substrate layer 104 and/or the first substrate layer 102. In other words, one or more of the respective substrate layers can be characterized by one or more different dimensions than other respective substrate layers. FIG. 2 also depicts that the third electrically conductive material 112 can be positioned into a coil having one or more different dimensions than the coil of the first electrically conductive material 108 and/or the coil of the second electrically conductive material 110. In other words, one or more respective coils of electrically conductive material can be characterized by one or more different dimensions than other respective coils of electrically conductive materials.

Furthermore, while FIGS. 1 and 2 depict the plurality of substrate layers as substantially flat surfaces, the architecture of the NFC antenna 100 is not so limited. In various embodiments one or more of the substrate layers, and thereby one or more coils of the electrically conductive material, can be bent and/or curved to mimic one or more supportive structures that the NFC antenna 100 can rest upon and/or can be fixed upon. For example, the flexible nature of the one or more substrate layers can enable the NFC antenna 100 to be formed to complement irregular and/or curved surfaces. Additionally, respective substrate layers can have curves and/or bends of different degrees and/or magnitudes than curves and/or bends of other respective substrate layers comprising the NFC antenna 100. For example, the NFC antenna 100 can be configured to accommodate a bump in a supportive surface by comprising substrate layers with curved central regions along the vertical direction (e.g., represented by "Y") that can complement the dimensions of the subject bump. Further, the slope of the curved central regions can be uniform amongst the respective substrate layers, or the slope of the curved central region for one or more substrate layers (e.g., first substrate layer 102) can be different (e.g., greater than and/or less than) the slope of the curved central region for one or more other substrate layers (e.g., second substrate layer 104 and/or third substrate layer 106).

Moreover, a magnetic field associated with the induced current within the electrically conductive materials can be omni-directional wherein the electrically conductive materials are comprised within curved substrate layers. In other words, curving one or more of the substrate layers can affect the direction of the associated magnetic field (e.g., represented by the "B" arrow). Thus, the one or more NFC antennas 100 described herein can be flexible and/or omni-directional to better couple to one or more space-dispersed magnetic fields. In addition, one or ordinary skill in the art will recognize that the one or more NFC antennas 100 can be operated in a single ended mode, a double-ended mode, and/or grounded mode.

Figure 3A:
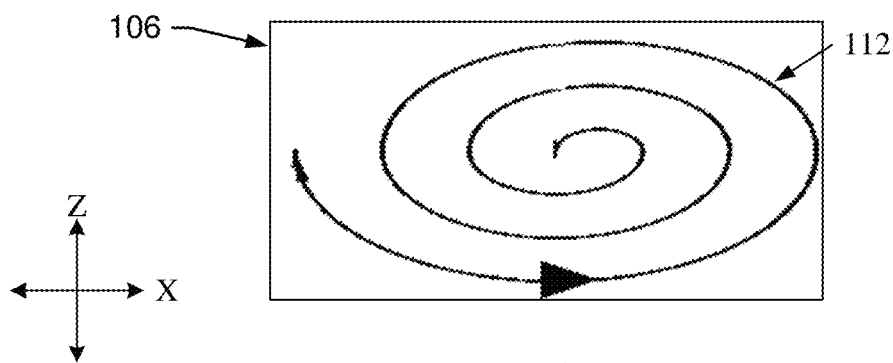
FIG. 3A illustrates a diagram of an example, non-limiting coil layer that can comprise a near-field communications antenna, which can comprise a plurality of coils stacked in a vertical orientation in accordance with one or more embodiments described herein.

FIG. 3A illustrates a diagram of the example, non-limiting third substrate layer 106 in accordance with one or more embodiments described herein. Repetitive description of like elements employed in other embodiments described herein is omitted for sake of brevity. FIG. 3A can depict an overview of the third substrate layer 106. As shown in FIG. 3A, the third electrically conductive material 112 can be positioned into a coil (e.g., wound in the counter-clockwise direction) comprised within the third substrate layer 106. Further, the third substrate layer 106 can comprise one or more interconnection vias 114 (e.g., located in a peripheral region) to facilitate operable coupling of the third electrically conductive material 112 with other respective electrically conductive materials.

Figure 3B:
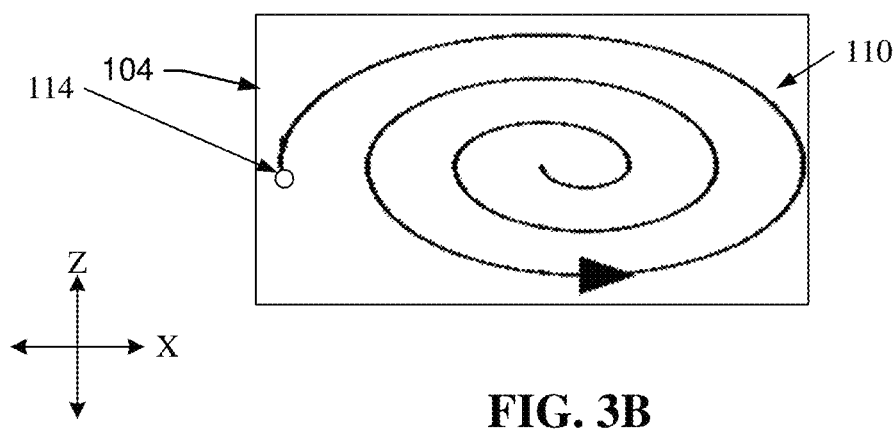
FIG. 3B illustrates a diagram of an example, non-limiting coil layer that can comprise a near-field communications antenna, which can comprise a plurality of coils stacked in a vertical orientation in accordance with one or more embodiments described herein.

FIG. 3B illustrates a diagram of the example, non-limiting second substrate layer 104 in accordance with one or more embodiments described herein. Repetitive description of like elements employed in other embodiments described herein is omitted for sake of brevity. FIG. 3B can depict an overview of the second substrate layer 104. As shown in FIG. 3B, the second electrically conductive material 110 can be positioned into a coil (e.g., wound in the clockwise direction) comprised within the second substrate layer 104. Further, the second substrate layer 102 can comprise one or more interconnection vias 114 (e.g., located in a peripheral region and/or a central region) to facilitate operable coupling of the second electrically conductive material 110 with other respective electrically conductive materials.

Figure 3C:
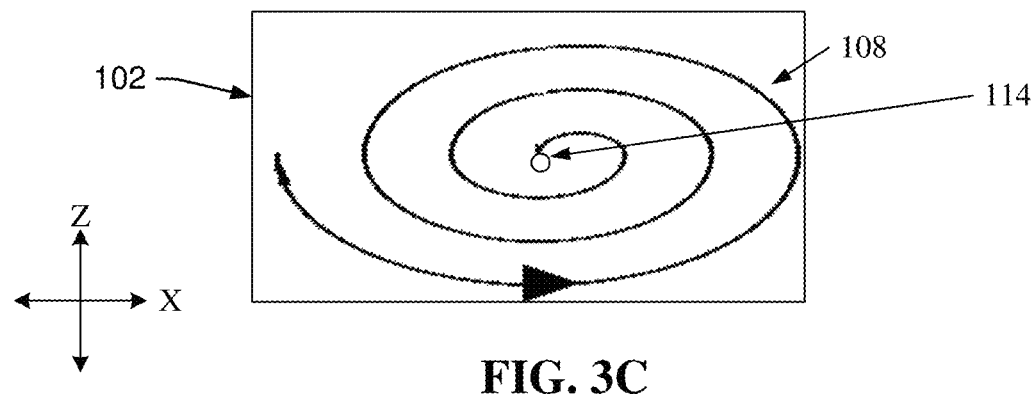
FIG. 3C illustrates a diagram of an example, non-limiting coil layer that can comprise a near-field communications antenna, which can comprise a plurality of coils stacked in a vertical orientation in accordance with one or more embodiments described herein.

FIG. 3C illustrates a diagram of the example, non-limiting first substrate layer 102 in accordance with one or more embodiments described herein. Repetitive description of like elements employed in other embodiments described herein is omitted for sake of brevity. FIG. 3C can depict an overview of the first substrate layer 102. As shown in FIG. 3C, the first electrically conductive material 108 can be positioned into a coil (e.g., wound in the counter-clockwise direction) comprised within the first substrate layer 102. Further, the third substrate layer 106 can comprise one or more interconnection vias 114 (e.g., located in a center region) to facilitate operable coupling the first electrically conductive material 108 with other respective electrically conductive materials.

Figure 4:
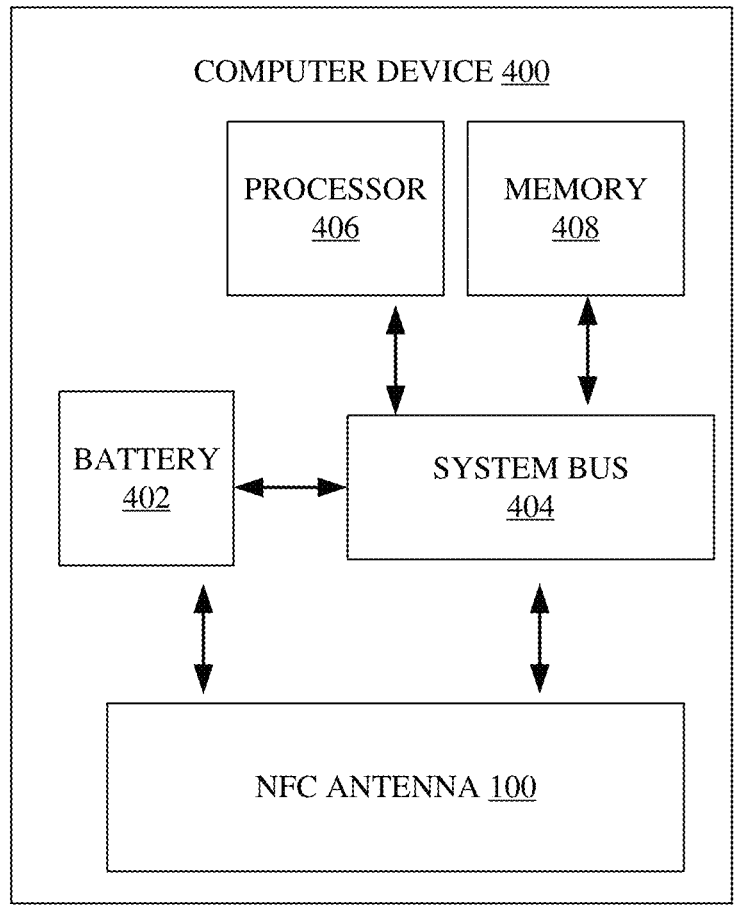
FIG. 4 illustrates a block diagram of an example, non-limiting computer device that can comprise a near-field communications antenna, which can comprise a plurality of coils stacked in a vertical orientation in accordance with one or more embodiments described herein.

FIG. 4 illustrates a block diagram of an example, non-limiting computer device 400 that can comprise the one or more NFC antennas 100 in accordance with one or more embodiments described herein. Repetitive description of like elements employed in other embodiments described herein is omitted for sake of brevity. As shown in FIG. 4, the one or more NFC antennas 100 can be comprised within a computer device 400 and can be operably coupled to one or more batteries 402 and/or one or more system buses 404. Further the one or more system buses 404 can be operably coupled to one or more processors 406 and/or one or more memories 408.

In one or more embodiments, the computer device 400 can be a mobile device, wherein the one or more NFC antennas 100 can facilitate wireless charging of the computer device 400. Example computer devices 400 can include, but are not limited to: smart phones, digital assistants, computers (e.g., laptops), smart wearables (e.g., smart watches and/or bracelets), health monitoring systems (e.g., a heart beat monitor and/or step tracker), computer tablets, a combination thereof, and/or the like. As shown in FIG. 4, the one or more NFC antennas 100 can be operably coupled to one or more batteries 402 of the computer device 400. Thus, the one or more NFC antennas 100 can utilize NFC technology to facilitate charging the one or more batteries 402 via a wireless interaction with one or more charging devices (e.g., also comprising one or more NFC antennas 100.

Additionally, in one or more embodiments the one or more NFC antennas 100 can facilitate and/or otherwise trigger execution, for example by the one or more processors 406, of one or more computer program instructions, which can be stored in the one or more memories 408. For example, the one or more computer program instructions can comprise tasks and/or routines to be performed by the processor 406 in response to an induced electrical current generated within the one or more NFC antennas 100. For instance, based on an induced electrical current generated within the one or more NFC antennas 100, one or more program instructions can cause the one or more processors 406 to execute and/or otherwise perform one or more computer applications. In another instance, based on an induced electrical current generated within the one or more NFC antennas 100, one or more program instructions can cause the one or more processors 406 to facilitate a data transfer. Said data transfer can, for example, be between two or more NFC enabled devices (e.g., one or more computer devices 400). An example data transfer can include, but is not limited to, a transfer of digital currency to facilitate one or more payment methods.

Figure 5:
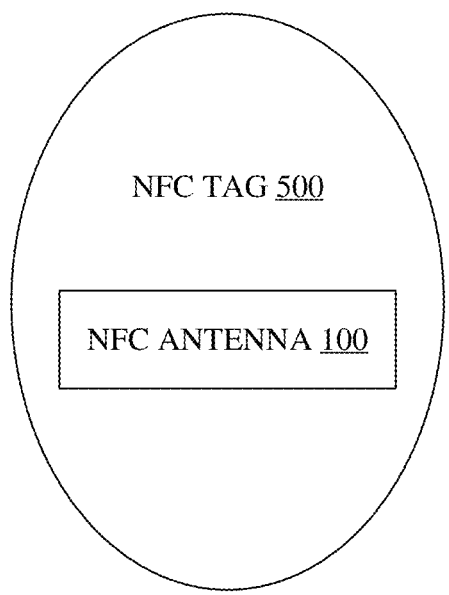
FIG. 5 illustrates a block diagram of an example, non-limiting near-field communications tag that can comprise a near-field communications antenna, which can comprise a plurality of coils stacked in a vertical orientation in accordance with one or more embodiments described herein.

FIG. 5 illustrates a block diagram of an example, non-limiting NFC tag 500 that can comprise the one or more NFC antennas 100 in accordance with one or more embodiments described herein. Repetitive description of like elements employed in other embodiments described herein is omitted for sake of brevity. The NFC tag 500 can comprise the one or more NFC antennas 100 as passive circuits that can draw power from one or more devices that interact (e.g., read the NFC tag 500) through, for example, magnetic induction.

The NFC tag 500 can be incorporated into various products (e.g., posters, circuitry chips, flyers, business cards, food packaging articles, stickers, prescription bottles, and/or the like) and can utilize NFC technology to interact with one or more computerized devices (e.g., one or more computer devices 400). One of ordinary skill in the art will readily recognize that the one or more NFC antennas 100 can be programmable to facilitate and/or trigger one or more computer program instructions. Thus, an NFC tag 500 can comprise one or more NFC antennas 100 that can interact with one or more other NFC enabled devices (e.g., one or more computer devices 400) to transfer data and/or instruct the NFC enabled device to perform one or more functions. For example, a promotional flyer regarding an upcoming event can comprise one or more NFC tags 500, wherein one or more computer devices 400 can interact with the one or more NFC tags 500 using NFC technology (e.g., magnetic induction), and wherein said interaction can instruct one or more processors 406 of the one or more computer devices 400 to open a website regarding the upcoming event for a user to view. One of ordinary skill in the art will recognize that various program functions that are within the traditional operation of a computer device 400 can be facilitated and/or triggered by the interaction of NFC antennas 100 (e.g., with one or more NFC tags 500) through NFC technology (e.g., magnetic inductance).

Figure 6:
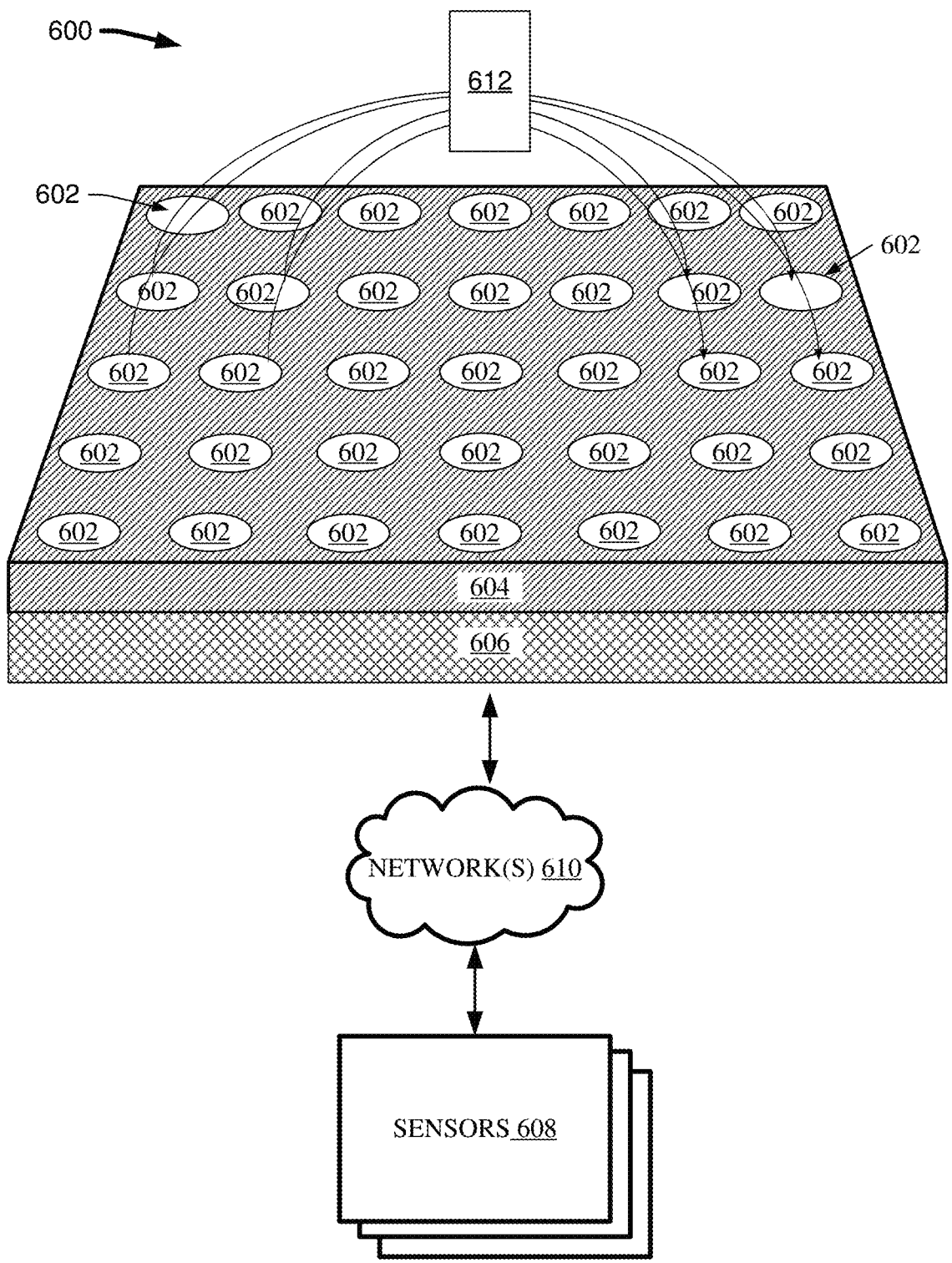
FIG. 6 illustrates a diagram of an example, non-limiting system that comprise one or more near-field communications antennas, which can respectively comprise a plurality of coils stacked in a vertical orientation in accordance with one or more embodiments described herein.

FIG. 6 illustrates a diagram of an example, non-limiting charging system 600 that can facilitate charging one or more NFC enabled devices (e.g., one or more computer devices 400) in accordance with one or more embodiments described herein. Repetitive description of like elements employed in other embodiments described herein is omitted for sake of brevity. As shown in FIG. 6, a plurality of NFC transmitters 602 can be arranged into an array comprised within a charging station 604. The charging station 604 can further be coupled to one or more controllers 606, which can be operably coupled to one or more sensors 608 via one or more networks 610.

The one or more NFC transmitters 602 can comprise traditional NFC antenna structures and/or can comprise the one or more NFC antennas 100 described herein. The one or more NFC transmitters 602 can be arranged in an array and/or matrix configuration. The number of NFC transmitters 602 comprising the array and/or matrix and/or the orientation of the array and/or matrix can be dependent on the dimensions and/or functionality of the one or more charging stations 604. Further, the array and/or matrix of NFC transmitters 602 can be embedded within, encapsulated by, and/or located on the one or more charging stations 604. The array and/or matrix of NFC transmitters 602 can create a magnet field distribution through the space surrounding the one or more charging stations 604. For example, the plurality of arrows connecting multiple NFC transmitters 602 in FIG. 6 can represent one or more magnetic field distributions.

The one or more charging stations 604 can house the array and/or matrix of NFC transmitters 602 and/or provide mechanical support for the array and/or matrix of NFC transmitters 602. In one or more embodiments, the one or more charging stations 604 can comprise the plurality of substrate layers described herein, wherein the respective NFC transmitters 602 can be the one or more NFC antennas 100 in which each NFC transmitter 602 can comprise electrically conductive material stacked vertically in accordance with the one or more embodiments described herein. In various embodiments, the one or more charging stations 604 can comprise a material other than the one or more substrate layers described herein. Example material that can comprise the one or more charging stations 604 can include, but are not limited to: plastics, rubbers, metals, ceramics, polymers, glass, electric insulators, cloth, a combination thereof, and/or the like. For instance, the one or more charging stations 604 can comprise a plastic material that can house the one or more NFC transmitters 602. Furthermore, the one or more charging stations 604 and/or the respective NFC transmitters 602 can be operably connected to an electrical power source.

One or more NFC receivers 612 can enter the one or more magnetic fields generated by the array and/or matric of NFC transmitters 602 and thereby generate an induced electric current, which can be used to charge one or more external power sources. For example, the one or more computer devices 400 can serve as the one or more NFC receivers 612, wherein the one or more computer devices 400 can charge the one or more external power sources (e.g., batteries 402) through magnetic inductance via the interaction of one or more NFC antennas 100 comprised within the one or more computer devices 400 and/or the plurality of NFC transmitters 602.

In various embodiments, the charging system 600 can further comprise one or more sensors 608, which can detect a location of the one or more NFC receivers 612 in relation to the NFC transmitter 602 array and/or matrix and/or the one or more charging stations 604. While FIG. 6 depicts the one or more sensors 608 as external to the one or more charging stations 604, the one or more controllers 606, and/or the one or more NFC receivers 612, the architecture of the charging system 600 is not so limited. For example, the one or more sensors 608 can also be, and/or alternatively be, comprised within the one or more charging stations 604, the one or more controllers 606, and/or the one or more NFC receivers 612. Example devices that can comprise the one or more sensors 608 can include, by are not limited to: gyroscopes, cameras, pressure sensors, lasers, global positioning systems ("GPS"), geofence systems, proximity sensors (e.g., inductive and/or magnetic based proximity sensors), accelerometers, strain gauges, optical sensors, the NFC antenna 100 itself, a combination thereof, and/or the like.

The NFC transmitter 602 array and/or matrix and/or the one or more charging stations 604 can be operably coupled to one or more controllers 606. The one or more controllers 606 can comprise one or more processors, can be operably coupled to one or more electric power sources (e.g., batteries), and/or can control the operational status of one or more respective NFC transmitters 602. Control of the operation status of one or more respective NFC transmitters 602 can comprise, for example: activating (e.g., supplying power to) one or more NFC transmitters 602, deactivating (e.g., inhibiting the supply of power to) one or more NFC transmitters 602, facilitating data transfer, changing the current flow directions and/or magnitudes of one or more NFC transmitters 602, a combination thereof, and/or like. By controlling the operation status of one or more respective NFC transmitters 602, the one or more controllers 606 can tune the magnetic field distribution of the NFC transmitter 602 array and/or matrix to optimize energy transfer efficiency. Further, the one or more controllers 606 can control said operation status based on the location of the one or more NFC receivers 612, as determined, for example, by the one or more sensors 608.

The one or more networks 610 can comprise wired and wireless networks, including, but not limited to, a cellular network, a wide area network (WAN) (e.g., the Internet) or a local area network (LAN). For example, the one or more controllers 606 can communicate with the one or more sensors 608 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like.

Figure 7:
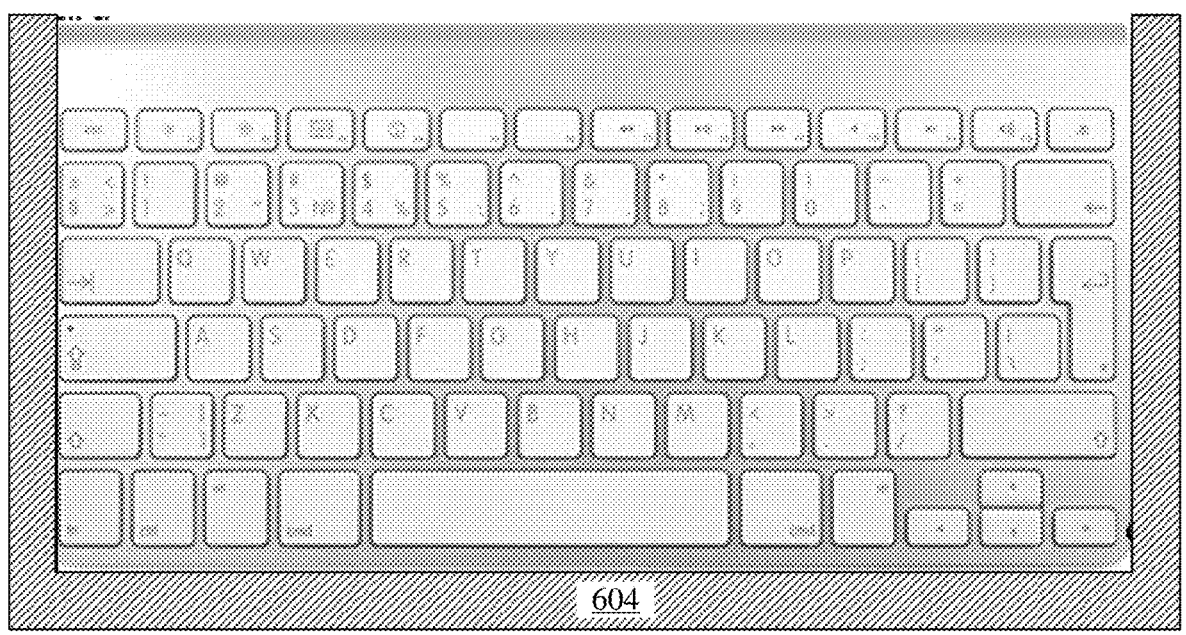
FIG. 7 illustrates a diagram of an example, non-limiting charging station that can comprise one or more systems, which can facilitate wireless charging using near-field communications technology in accordance with one or more embodiments described herein.

FIG. 7 illustrates a diagram of an example, non-limiting keyboard 700 that can comprise one or more charging stations 604 and/or facilitate one or more charging systems 600 in accordance with the one or more embodiments described herein. Repetitive description of like elements employed in other embodiments described herein is omitted for sake of brevity. As shown in FIG. 7, a computer keyboard can be equipped with various features of the charging system 600 to facilitate wireless charging of one or more NFC enabled devices (e.g., one or more computer devices 400).

FIG. 7 depicts a charging station 604 that can be located adjacent to a plurality of sides of a computer keyboard 700. The charging station 604 can comprise a plurality of NFC transmitters 602 and/or one or more controllers 606 in accordance with one or more embodiments described herein. In various embodiments, the charging station 604 can also comprise one or more sensors 608. In one or more embodiments, one or more sensors 608 can be comprised within an NFC receiver 612 and/or can communicate with the one or more controllers 606 via one or more networks 610. For example, the one or more NFC receivers 612 can be one or more computer devices 400, which can be worn, for example upon the wrist, by a user of the keyboard 700. Upon using the keyboard 700, a user wearing the one or more computer devices 400 can bring the one or more computer devices 400 into the magnetic field generated by the plurality of NFC transmitters 602, thereby charging the one or more computer devices 400 via magnetic induction. Further, the one or more sensors 608, for example comprised within the one or more computer devices 400 and/or the keyboard 700, can communicate a detected position of the one or more computer devices 400 to the one or more controllers 606. Moreover, the one or more controllers 606 can control the operation status of one or more of the NFC transmitters 602 to adjust the magnetic field distribution to optimize energy transfer efficiency.

In addition to the keyboard 700 depicted in FIG. 7, one of ordinary skill in the art can recognize that various features of the charging system 600 can be incorporated into a plethora of products to facilitate wireless charging of NFC enabled devices and/or execution of programmed computer instructions. For example, the one or more NFC transmitters 602, the one or more charging stations 604, the one or more controllers 606, and/or the one or more sensors 608 can be incorporated into, but are not limited to: car steering wheels, seats, bed frames, bed platforms, mattresses, desks, tables, chairs, office furniture, bedroom furniture (e.g., night stands), coffee tables, a combination thereof, and/or the like.

FIG. 8 illustrates a flow diagram of an example, non-limiting method 800 that can facilitate manufacturing one or more NFC antennas 100 in accordance with one or more embodiments described herein. Repetitive description of like elements employed in other embodiments described herein is omitted for sake of brevity.

At 802, the method 800 can comprise dispensing a first layer of electrically conductive material onto a substrate to form a first coil (e.g., a coil of the first electrically conductive material 108) that can be wound in a first direction. The electrically conductive material can be in the form of an electrically conductive paste and/or ink. Further, the dispensing at 802 can be performed by a printer device, such as a three-dimensional printer. In one or more embodiments, the substrate can a surface that can provide mechanical support and/or house the subject NFC antenna 100 (e.g., the charging station 604, a computer device 400, and/or a product that can incorporate one or more features of the charging system 600). Also, the first direction can be the clockwise direction or the counter-clockwise direction. Moreover, a thickness of the first layer of electrically conductive material can be controlled by the speed of dispensing and/or the viscosity of the electrically conductive material.

At 804, the method 800 can comprise dispensing an insulating polymer onto the first coil and/or around one or more interconnection points to form one or more interconnection vias 114. The insulating polymer can serve to seal and/or insulate the first coil (e.g., a coil of the first electrically conductive material 108) from adjacent features comprising the subject NFC antenna 100. The one or more interconnection points, and thereby the one or more interconnection vias 114, can be located in peripheral and/or center regions of the subject NFC antenna 100. Also, the dispensing at 804 can form a substrate layer (e.g., the first substrate layer 102).

At 806, the method 800 can comprise dispensing a second layer of electrically conductive material onto the insulating polymer and/or the one or more interconnection vias 114 to form a second coil (e.g., a coil of the second electrically conductive material 110) that is wound in a second direction. The second direction can be opposite to the first direction. Also, the first coil (e.g., comprising the first electrically conductive material 108) can be operably coupled to the second coil (e.g., comprising the second electrically conductive material 110) through the one or more interconnection vias 114. Further, the first coil and/or the second coil can form an NFC antenna 100.

The electrically conductive material dispensed at 806 can be in the form of an electrically conductive paste and/or ink. Further, the dispensing at 806 can be performed by a printer device, such as a three-dimensional printer. Also, the first direction can be the clockwise direction or the counter-clockwise direction. Additionally, the method 800 can further comprise dispensing additional insulating polymer onto the second coil to form another substrate layer (e.g., the second substrate layer 104) of the NFC antenna 100. Moreover, a thickness of the second layer of electrically conductive material can be controlled by the speed of dispensing and/or the viscosity of the electrically conductive material.

FIG. 9 illustrates a flow diagram of an example, non-limiting method 900 that can facilitate manufacturing one or more NFC antennas 100 in accordance with one or more embodiments described herein. Repetitive description of like elements employed in other embodiments described herein is omitted for sake of brevity.

At 902, the method 900 can comprise dispensing a first layer of electrically conductive material onto a substrate to form a first coil (e.g., a coil of the first electrically conductive material 108) that can be wound in a first direction. The electrically conductive material can be in the form of an electrically conductive paste and/or ink. Further, the dispensing at 902 can be performed by a printer device, such as a three-dimensional printer. In one or more embodiments, the substrate can comprise for example, an electrical insulator material such as an insulating polymer. In one or more embodiments, the substrate can be a surface that can provide mechanical support and/or house the subject NFC antenna 100 (e.g., the charging station 604, a computer device 400, and/or a product that can incorporate one or more features of the charging system 600). Also, the first direction can be the clockwise direction or the counter-clockwise direction. Moreover, a thickness of the first layer of electrically conductive material can be controlled by the speed of dispensing and/or the viscosity of the electrically conductive material.

At 904, the method 900 can comprise dispensing an insulating polymer onto the first coil and/or around one or more interconnection points to form one or more interconnection vias 114. The insulating polymer can serve to seal and/or insulate the first coil (e.g., a coil of the first electrically conductive material 108) from adjacent features comprising the subject NFC antenna 100. The one or more interconnection points, and thereby the one or more interconnection vias 114, can be located in peripheral and/or center regions of the subject NFC antenna 100. Also, the dispensing at 904 can form a substrate layer (e.g., the first substrate layer 102). A thickness of the first insulating polymer can be controlled by the speed of dispensing and/or the viscosity of the insulating polymer.

At 906, the method 900 can comprise dispensing a second layer of electrically conductive material onto the insulating polymer and/or the one or more interconnection vias 114 to form a second coil (e.g., a coil of the second electrically conductive material 110) that is wound in a second direction. The second direction can be opposite to the first direction. Also, the first coil (e.g., comprising the first electrically conductive material 108) can be operably coupled to the second coil (e.g., comprising the second electrically conductive material 110) through the one or more interconnection vias 114. Further, the first coil and/or the second coil can form an NFC antenna 100.

The electrically conductive material dispensed at 906 can be in the form of an electrically conductive paste and/or ink. Further, the dispensing at 906 can be performed by a printer device, such as a three-dimensional printer. Also, the first direction can be the clockwise direction or the counter-clockwise direction. Moreover, a thickness of the second layer of electrically conductive material can be controlled by the speed of dispensing and/or the viscosity of the electrically conductive material.

At 908, the method 900 can comprise dispensing a second insulating polymer onto the second coil (e.g., comprising the second electrically conductive material) and/or around one or more second interconnection points to form one or more second interconnection vias 114. The one or more second interconnection vias 114 can be locate in an alternate region of the NFC antenna 100 than the one or more interconnection vias 114 formed at 904. For example, wherein the one or more interconnection vias 114 formed at 904 are formed in a center region of the subject NFC antenna 100, the one or more second interconnection vias 114 formed at 908 can be located in a peripheral region of the subject NFC antenna 100. A thickness of the second insulating polymer can be controlled by the speed of dispensing and/or the viscosity of the insulating polymer.

At 910, the method 900 can comprise dispensing a third layer of electrically conductive material onto the second insulating polymer and/or the one or more second interconnection vias 114 to form a third coil (e.g., comprising the third electrically conductive material 112) that can be wound in the first direction. A thickness of the third layer of electrically conductive material can be controlled by the speed of dispensing and/or the viscosity of the electrically conductive material. The third coil (e.g., comprising the third electrically conductive material 112) can be operably coupled to the second coil (e.g., comprising the second electrically conductive material 110) through the one or more second interconnection vias 114. Also, the one or more second interconnection vias 114 formed at 908 can be located at the first end of the second coil (e.g., in a peripheral region), while the one or more interconnection vias 114 formed at 904 can be located at the second end of the second coil (e.g., in a center region). Thus, the second end of the first coil can be operably coupled to the second end of the second coil and/or the first end of the second coil can be operably coupled to the first end of the third coil.

In various embodiments, dispensed materials (e.g., electrically conductive materials and/or insulating polymers) can be allowed to cure prior to subsequent dispensing of other materials (e.g., subsequent layers of electrically conductive material and/or insulating polymers). For example, one or more methods (e.g., 800 and/or 900) described herein can be facilitated by an assembly line of devices (e.g., printer devices such as three-dimensional printers), wherein transition time between sequential devices can facilitate curing of dispensed materials.

FIG. 10 illustrates a flow diagram of an example, non-limiting method 1000 that can facilitate manufacturing one or more NFC antennas 100 in accordance with one or more embodiments described herein. Repetitive description of like elements employed in other embodiments described herein is omitted for sake of brevity.

At 1002, the method 1000 can comprise defining a first electrically conductive coil (e.g., comprising the first electrically conductive material 108) into a first substrate layer 102 using photolithography, wherein the first electrically conductive coil is wound in a first direction (e.g., the clockwise direction or the counter-clockwise direction). For example, the first substrate layer 102 can comprise an insulating polymer coated with an electrically conductive material (e.g., copper). The photolithography at 1002 can remove portions of said coating such that the remaining portions of the coating can comprise the first electrically conductive coil. In another example, the first substrate layer 102 can be coated with a protective mask layer (e.g., a photomask), thereby creating exposed portions of the first substrate layer 102 and/or protected portions of the first substrate layer 102. The exposed portions of the first substrate layer 102 can then be subject to an etching process (e.g., reactive-ion etching) to form a trench. Further, the first electrically conductive material 108 can be deposited into the trench to form a coil of first electrically conductive material 108 comprised within the first substrate layer 102. Optionally, the first substrate layer 102, comprising the first electrically conductive material 108, can be planarized (e.g., via chemical mechanical planarization).

At 1004, the method 1000 can comprise defining a second electrically conductive coil (e.g., comprising the second electrically conductive material 110) into a second substrate layer 104 using photolithography, wherein the second electrically conductive coil is wound in a second direction (e.g., the clockwise direction or the counter-clockwise direction) opposite to the first direction. For example, the second substrate layer 104 can comprise an insulating polymer coated with an electrically conductive material (e.g., copper). The photolithography at 1004 can remove portions of said coating such that the remaining portions of the coating can comprise the second electrically conductive coil. In another example, the second substrate layer 104 can be coated with a protective mask layer (e.g., a photomask), thereby creating exposed portions of the second substrate layer 104 and/or protected portions of the second substrate layer 104. The exposed portions of the second substrate layer 104 can then be subject to an etching process (e.g., reactive-ion etching) to form a trench. Further, the second electrically conductive material 110 can be deposited into the trench to form a coil of second electrically conductive material 110 comprised within the second substrate layer 104. Optionally, the second substrate layer 104, comprising the second electrically conductive material 110, can be planarized (e.g., via chemical mechanical planarization).

At 1006, the method 1000 can comprise stacking the second substrate layer 104 onto the first substrate layer 102, wherein the first electrically conductive coil can be operably coupled to the second electrically coupled coil to form an NFC antenna 100. For example, the second substrate layer can comprise one or more interconnection vias 114 that can facilitate the coupling at 1006. The one or more interconnection vias 114 can be located in a center region or a periphery region of the subject NFC antenna 100. Further, in one or more embodiments the stacking at 1006 can comprise fixing the second substrate layer 104 to the first substrate layer 102.

FIG. 11 illustrates a flow diagram of an example, non-limiting method 1100 that can facilitate manufacturing one or more NFC antennas 100 in accordance with one or more embodiments described herein. Repetitive description of like elements employed in other embodiments described herein is omitted for sake of brevity.

At 1102, the method 1100 can comprise defining a first electrically conductive coil (e.g., comprising the first electrically conductive material 108) into a first substrate layer 102 using photolithography, wherein the first electrically conductive coil is wound in a first direction (e.g., the clockwise direction or the counter-clockwise direction). For example, the first substrate layer 102 can comprise an insulating polymer coated with an electrically conductive material (e.g., copper). The photolithography at 1102 can remove portions of said coating such that the remaining portions of the coating can comprise the first electrically conductive coil. In another example, the first substrate layer 102 can be coated with a protective mask layer (e.g., a photomask), thereby creating exposed portions of the first substrate layer 102 and/or protected portions of the first substrate layer 102. The exposed portions of the first substrate layer 102 can then be subject to an etching process (e.g., reactive-ion etching) to form a trench. Further, the first electrically conductive material 108 can be deposited into the trench to form a coil of first electrically conductive material 108 comprised within the first substrate layer 102. Optionally, the first substrate layer 102, comprising the first electrically conductive material 108, can be planarized (e.g., via chemical mechanical planarization).

At 1104, the method 1100 can comprise defining a second electrically conductive coil (e.g., comprising the second electrically conductive material 110) into a second substrate layer 104 using photolithography, wherein the second electrically conductive coil is wound in a second direction (e.g., the clockwise direction or the counter-clockwise direction) opposite to the first direction. For example, the second substrate layer 104 can comprise an insulating polymer coated with an electrically conductive material (e.g., copper). The photolithography at 1104 can remove portions of said coating such that the remaining portions of the coating can comprise the second electrically conductive coil. In another example, the second substrate layer 104 can be coated with a protective mask layer (e.g., a photomask), thereby creating exposed portions of the second substrate layer 104 and/or protected portions of the second substrate layer 104. The exposed portions of the second substrate layer 104 can then be subject to an etching process (e.g., reactive-ion etching) to form a trench. Further, the second electrically conductive material 110 can be deposited into the trench to form a coil of second electrically conductive material 110 comprised within the second substrate layer 104. Optionally, the second substrate layer 104, comprising the second electrically conductive material 110, can be planarized (e.g., via chemical mechanical planarization).

At 1106, the method 1100 can comprise stacking the second substrate layer 104 onto the first substrate layer 102, wherein the first electrically conductive coil can be operably coupled to the second electrically coupled coil to form an NFC antenna 100. For example, the second substrate layer can comprise one or more interconnection vias 114 that can facilitate the coupling at 1006. The one or more interconnection vias 114 can be located in a center region or a periphery region of the subject NFC antenna 100. Further, in one or more embodiments the stacking at 1106 can comprise fixing the second substrate layer 104 to the first substrate layer 102.

At 1108, the method 1100 can comprise defining a third electrically conductive coil (e.g., comprising the third electrically conductive material 112) into a third substrate layer 106 using photolithography, wherein the first electrically conductive coil is wound in the first direction (e.g., the clockwise direction or the counter-clockwise direction). For example, the third substrate layer 106 can comprise an insulating polymer coated with an electrically conductive material (e.g., copper). The photolithography at 1108 can remove portions of said coating such that the remaining portions of the coating can comprise the third electrically conductive coil. In another example, the third substrate layer 106 can be coated with a protective mask layer (e.g., a photomask), thereby creating exposed portions of the third substrate layer 106 and/or protected portions of the third substrate layer 106. The exposed portions of the third substrate layer 106 can then be subject to an etching process (e.g., reactive-ion etching) to form a trench. Further, the third electrically conductive material 112 can be deposited into the trench to form a coil of third electrically conductive material 112 comprised within the third substrate layer 106. Optionally, the third substrate layer 106, comprising the third electrically conductive material 112, can be planarized (e.g., via chemical mechanical planarization).

At 1110, the method 1100 can comprise stacking the third substrate layer 106 onto the second substrate layer 104, wherein the third electrically conductive coil can be operably coupled to the second electrically conductive coil via one or more second interconnection vias 114. The one or more interconnection vias 114 of 1106 can be located at a first end of the second electrically conductive coil, and/or the one or more second interconnection vias of 1110 can be located at a second end of the second electrically conductive coil. For example, the one or more interconnection vias 114 of 1106 can be located in a periphery region of the subject NFC antenna 100 and/or the one or more second interconnection vias 114 can be located in a center region of the subject NFC antenna 100. Further, the third electrically conductive coil can be comprised within the subject NFC antenna 100.

The various methods described herein (e.g., methods 800, 900, 1000, and/or 1100) can facilitate manufacturing of one or more NFC antennas 100 that can complement non-planar surfaces without increasing manufacturing complexity. For example, in various embodiments, the one or more NFC antennas 100 can be dispensed and/or printed directly onto non-planar surfaces (e.g., surfaces comprising bumps, ridges, and/or bends). Additionally, the various methods described herein (e.g., methods 800, 900, 1000, and/or 1100) can facilitate manufacturing arrays and/or matrixes of NFC antennas 100, which can cover large areas, without increasing manufacturing complexity. For example, substrate layers comprising a plurality of electrically conductive coils can be produced and/or stacked to manufacturing one or more arrays of NFC antennas 100.

Figure 12:
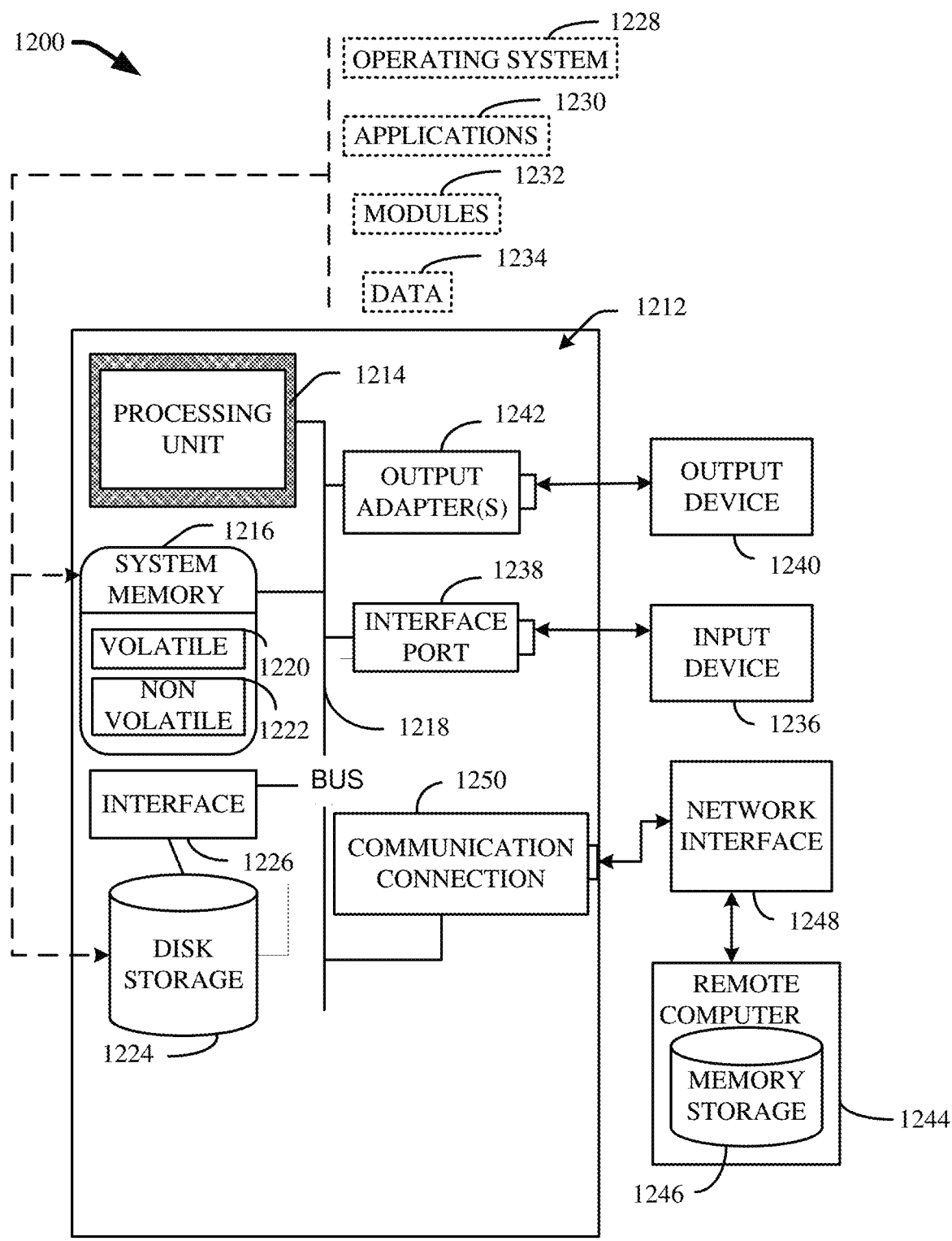
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment 1200 in which one or more embodiments described herein can be facilitated. For example, the operating environment 1200 can comprise and/or otherwise facilitate one or more features of the one or more computer devices 400, the one or more controllers 606, and/or the one or more NFC receivers 612 described herein in accordance with one or more embodiments. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a near-field communications antenna comprising:
        a first substrate layer comprising a first coil consisting of a first electrically conductive material that is wound in a first direction starting at a periphery of the first coil; and
        a second substrate layer comprising a second coil consisting of a second electrically conductive material that is wound in a second direction starting at a periphery of the second coil, wherein the second direction is opposite the first direction, wherein the second substrate layer is stacked onto the first substrate layer, wherein the first coil is operably coupled to the second coil through an interconnection via, and the first electrically conductive material is different from the second electrically conductive material.

2. The apparatus of claim 1, wherein the first substrate layer and the second substrate layer further comprise an insulating polymer, wherein the first direction is counter-clockwise, and wherein the second direction is clockwise.

3. The apparatus of claim 1, further comprising:
    a third substrate layer comprising a third coil of electrically conductive material that is wound in the first direction starting at a periphery of the third coil, wherein the third substrate layer is stacked onto the second substrate layer, wherein the third coil of electrically conductive material is operably coupled to the second coil of electrically conductive material through a second interconnection via, and wherein the third coil of electrically conductive material is comprised within the near-field communications antenna.

4. The apparatus of claim 3, wherein the interconnection via is located in a central region of the second substrate layer, and wherein the second interconnection via is located in a peripheral region of the third substrate layer.

5. The apparatus of claim 3, wherein the interconnection via is located in a peripheral region of the second substrate layer, and wherein the second interconnection via is located in a central region of the third substrate layer.

6. The apparatus of claim 3, wherein the interconnection via is located at a first end of the second coil of electrically conductive material, and wherein the second interconnection via is located at a second end of the second coil of electrically conductive material.

7. The apparatus of claim 1, wherein the near-field communications antenna is operably coupled to a battery and facilitates wireless charging of the battery.

8. The apparatus of claim 1, further comprising an array of near-field communications antennas, wherein the near-field communications antenna is comprised within the array of near-field communications antennas.

9. The apparatus of claim 8, further comprising:
a processor operably coupled to the array of near-field communications antennas; and
a sensor operably coupled to the processor, wherein the sensor detects a position of a near-field communications receiver antenna, and wherein the processor controls an operation status of respective near-field communication antennas comprised within the array of near-field communications antennas based on the position.

10. The apparatus of claim 9, wherein the operation status is selected from a group consisting of activation, deactivation, a direction of current, and a magnitude of current.

11. The apparatus of claim 9, wherein the first coil has a first number of turns, the second coil has a second number of turns, and the first number of turns is different from the second number of turns.

12. The apparatus of claim 1, further comprising:
a processor operably coupled to the near-field communications antenna; and
a memory that is operably coupled to a processor,
wherein the near-field communications antenna is configured to trigger execution, by the processor, of a computer executable program instruction stored within the memory.

13. A method comprising:
forming a near-field communications antenna, wherein the forming comprises:
dispensing a first layer consisting of a first electrically conductive material onto a substrate to form a first coil that is wound in a first direction starting at a central area of the first coil;
dispensing an insulating polymer onto the first coil and around an interconnection point to form an interconnection via; and
dispensing a second layer consisting of a second electrically conductive material onto the insulating polymer and the interconnection via to form a second coil that is wound in a second direction starting at a central area of the second coil, wherein the second direction is opposite to the first direction, wherein the first coil is operably coupled to the second coil through the interconnection via, and the first electrically conductive material is different from the second electrically conductive material.

14. The method of claim 13, wherein the first direction is clockwise, and wherein the second direction is counter-clockwise.

15. The method of claim 14, wherein the dispensing the first layer of electrically conductive material, the dispensing the insulating polymer, and the dispensing the second layer of electrically conductive material are performed via a three-dimension printer.

16. The method of claim 13, wherein the forming further comprises:
dispensing a second insulating polymer onto the second coil and around a second interconnection point to form a second interconnection via; and
dispensing a third layer of electrically conductive material onto the second insulating polymer and the second interconnection via to form a third coil that is wound in the first direction, wherein the third coil is operably coupled to the second coil through the second interconnection via, wherein the interconnection via is located at a second end of the second coil, wherein the second interconnection via is located at a first end of the second coil.

17. A method, comprising:
forming a near-field communications antenna, wherein the forming comprises:
defining a first electrically conductive coil into a first substrate layer using photolithography, wherein the first electrically conductive coil is wound in a first direction starting at a periphery of the first coil;
defining a second electrically conductive coil into a second substrate layer using photolithography, wherein the second electrically conductive coil is wound in a second direction starting at a periphery of the second coil, wherein the second direction is opposite to the first direction; and
stacking the second substrate layer onto the first substrate layer, wherein the first electrically conductive coil is operably coupled to the second electrically conductive coil, and wherein the first electrically conductive coil consisting of a first electrically conductive material, the second electrically conductive coil consisting of a second electrically conductive material, and the first electrically conductive material is different from the second electrically conductive material.

18. The method of claim 17, wherein the first direction is counter-clockwise, and wherein the second direction is clockwise.

19. The method of claim 17, wherein the first electrically conductive coil is operably coupled to the second electrically conductive coil by an interconnection via.

20. The method of claim 19, wherein the forming further comprises:
defining a third electrically conductive coil into a third substrate layer using photolithography, wherein the third electrically conductive coil is wound in the first direction; and
stacking the third substrate layer onto the second substrate layer, wherein the third electrically conductive coil is operably coupled to the second electrically conductive coil via a second interconnection via, wherein the interconnection via is located at a first end of the second electrically conductive coil, wherein the second interconnection via is located at a second end of the second electrically conductive coil.

* * * * *